(12) United States Patent
Watariuchi

(10) Patent No.: US 11,218,608 B2
(45) Date of Patent: Jan. 4, 2022

(54) INFORMATION PROCESSING SYSTEM, METHOD AND STORAGE MEDIUM

(71) Applicant: CANON KABUSHIKI KAISHA, Tokyo (JP)

(72) Inventor: Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/840,121

(22) Filed: Apr. 3, 2020

(65) Prior Publication Data
US 2020/0329162 A1  Oct. 15, 2020

(30) Foreign Application Priority Data
Apr. 9, 2019  (JP) .............................. JP2019-074415

(51) Int. Cl.
*H04N 21/40* (2011.01)
*H04N 1/00* (2006.01)
*G06F 16/957* (2019.01)
*G06F 16/954* (2019.01)
*G06F 16/955* (2019.01)

(52) U.S. Cl.
CPC ..... *H04N 1/00464* (2013.01); *G06F 16/9566* (2019.01); *G06F 16/9574* (2019.01)

(58) Field of Classification Search
USPC ........... 358/1.1–3.29, 1.11–1.18; 399/75–82; 707/608–623, 705–712, 799–800; 709/201–205, 227–253; 726/1–21
See application file for complete search history.

(56) References Cited

U.S. PATENT DOCUMENTS

| | | | |
|---|---|---|---|
| 9,961,233 B2 * | 5/2018 | Mizuno | G06F 21/604 |
| 10,708,450 B2 * | 7/2020 | Omori | G06F 3/0482 |
| 2007/0206088 A1 * | 9/2007 | Mizunashi | H04N 21/4143 348/14.01 |
| 2011/0157638 A1 | 6/2011 | Yamada | |
| 2011/0222102 A1 | 9/2011 | Ito | |
| 2011/0310431 A1 * | 12/2011 | Uchikawa | H04N 1/00424 358/1.15 |
| 2016/0105577 A1 | 4/2016 | Koike | |
| 2018/0059999 A1 * | 3/2018 | Kawakami | H04N 1/00411 |

FOREIGN PATENT DOCUMENTS

| | | |
|---|---|---|
| CN | 102006381 A | 4/2011 |
| CN | 108995403 A | 12/2018 |
| EP | 2495947 A2 | 9/2012 |
| JP | 2001-243165 A | 9/2001 |
| JP | 2016201744 A | 12/2016 |
| JP | 2017-108338 A | 6/2017 |

* cited by examiner

*Primary Examiner* — Marcellus J Augustin
(74) *Attorney, Agent, or Firm* — Canon U.S.A., Inc. IP Division

(57) ABSTRACT

A state of a user operation performed on a mobile terminal is registered in a Web server that can be accessed from the mobile terminal and a multifunction peripheral (MFP) in association with information about the user, and the state of the user operation is handed over to the MFP based on the registered information by the user simply logging into the MFP.

17 Claims, 18 Drawing Sheets

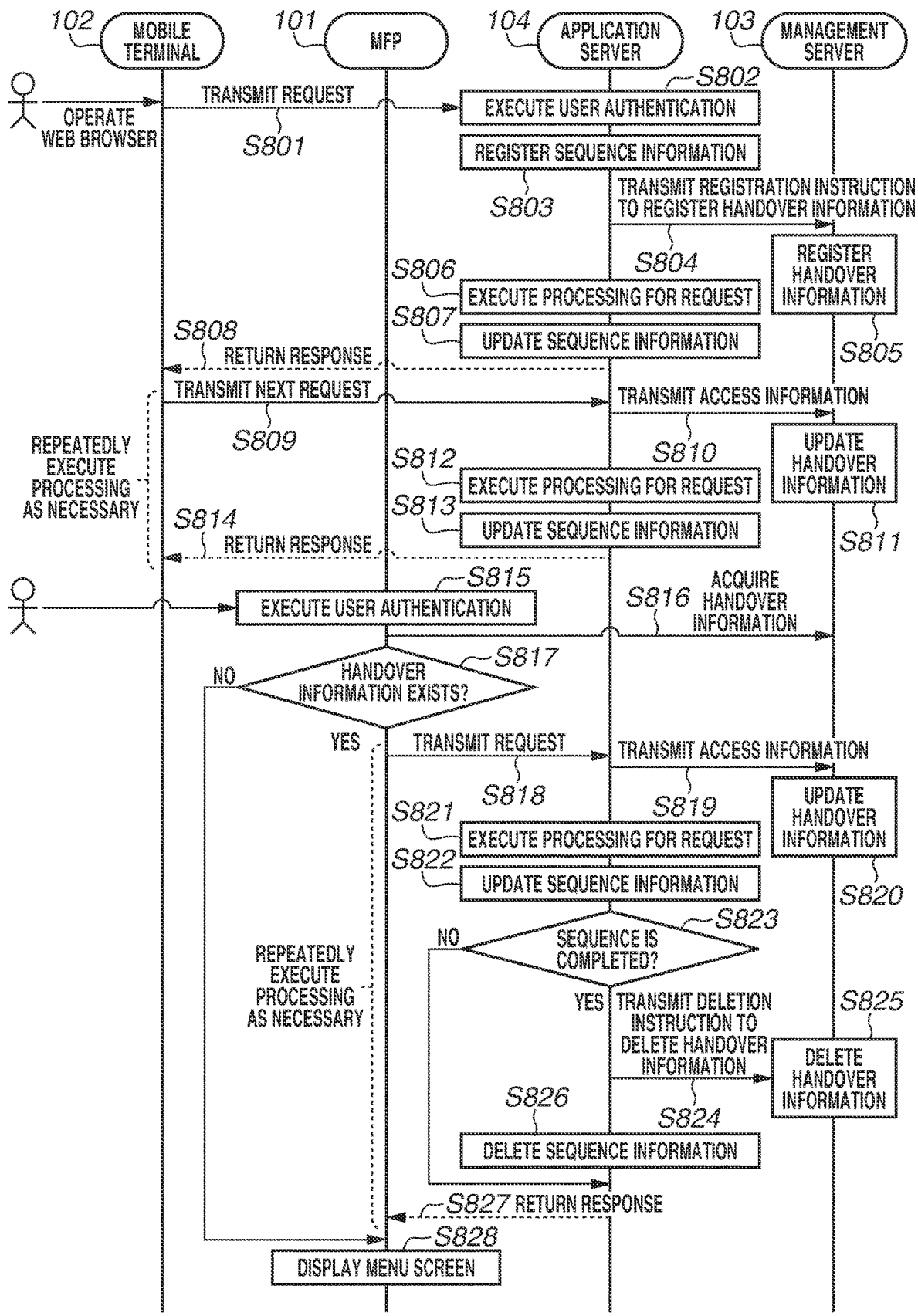

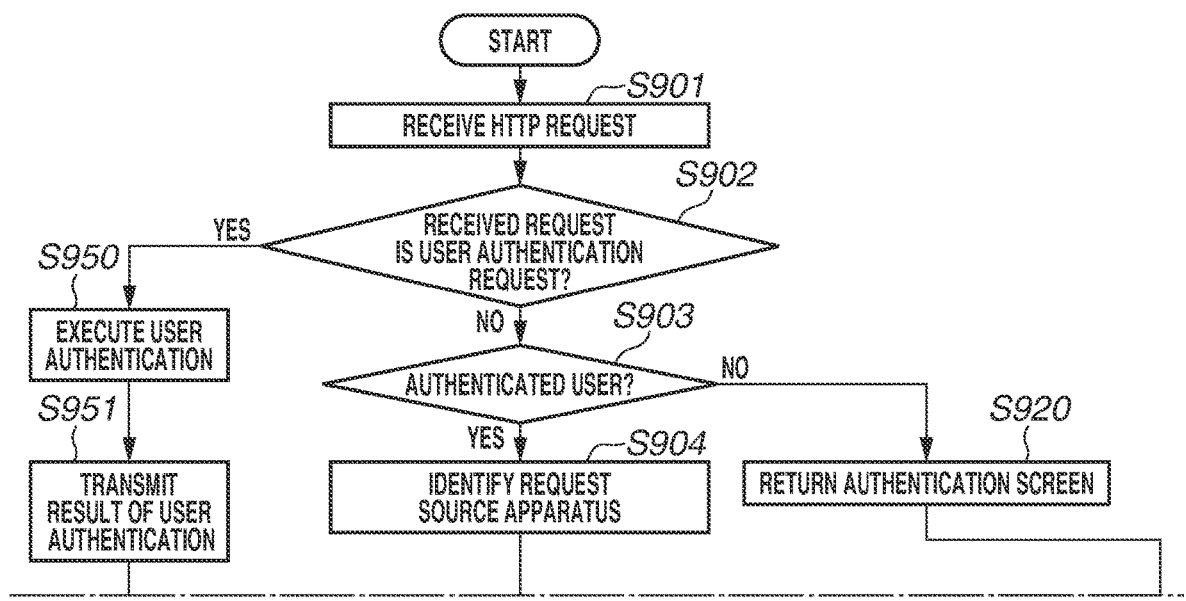
FIG.9A

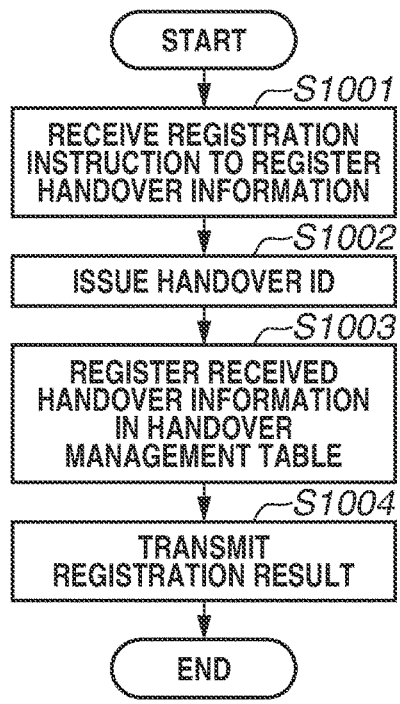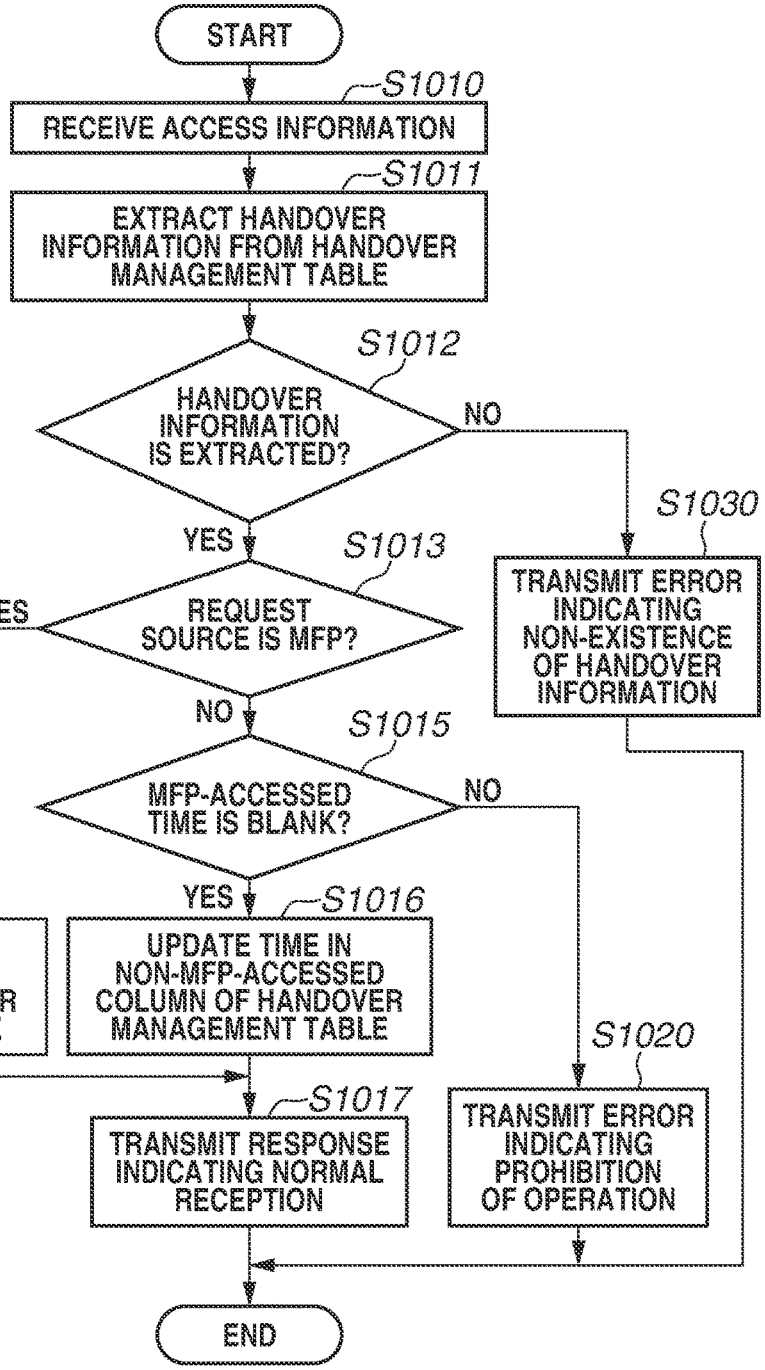

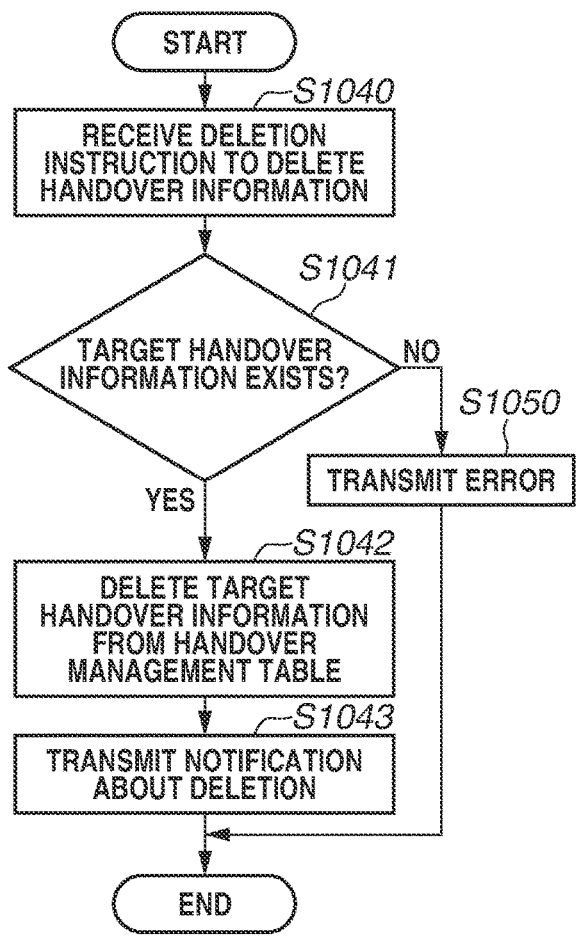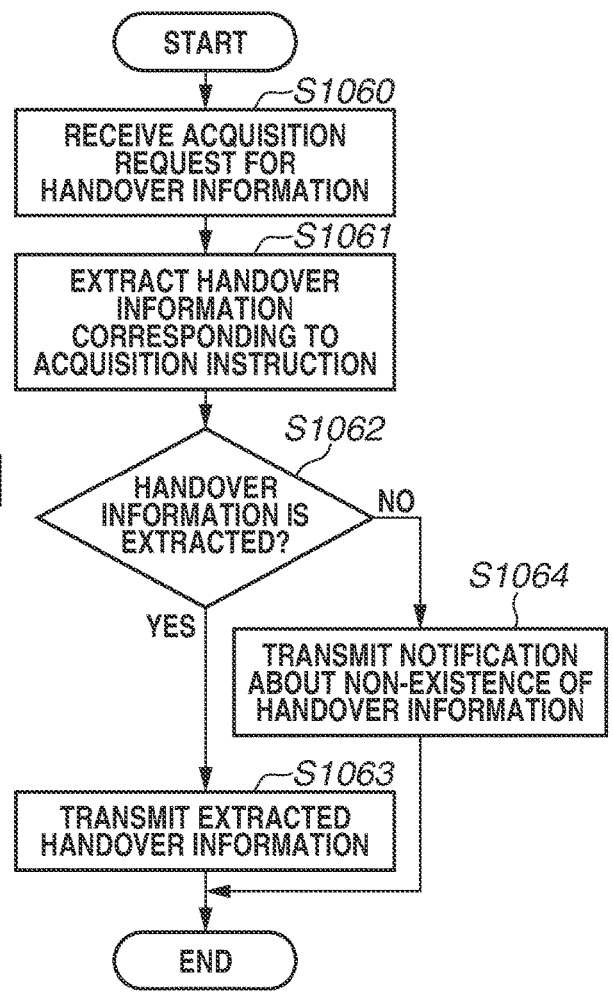

FIG.12

| SequenceID | SequenceData | UserID | HandoverID |
|---|---|---|---|
| s001 | SETTING SCREEN-1, COLOR, 300 × 300, JPEG, foo@exmple.com | u001 | h001 |
| s002 | CONFIRMATION SCREEN BEFORE EXECUTION, BLACK AND WHITE, 600 × 600, PDF, ¥¥server¥folder¥bar | u002 | h002 |
| ... | ... | ... | ... |

| HandoverID _1301_ | URL _1302_ | Non-MFP-Accessed _1303_ | MFP-Accessed _1304_ | UserID _1305_ |
|---|---|---|---|---|
| h001 | https://example.com/scan?id=s001 | 2018/10/17 8:31 PM | — | u001 |
| h002 | https://example.com/scan?id=s002 | 2018/10/10 11:50 AM | 2018/10/10 11:55 AM | u002 |
| h003 | https://app.example.org/pr?s=seq001 | 2018/10/12 6:52 PM | — | u003 |
| ... | ... | ... | ... | ... |

USER AUTHENTICATION SCREEN OF MOBILE TERMINAL

SETTING SCREEN 1 OF MOBILE TERMINAL

SETTING SCREEN 2 OF MOBILE TERMINAL

SETTING SCREEN 3 OF MOBILE TERMINAL

FIG.14E
SETTING SCREEN 1 OF MFP

SCAN SETTING SCREEN

SINGLE-SIDED DOCUMENT ▼

FULL COLOR ▼

PDF ▼

DOCUMENT SIZE A4 ▼

RETURN   1405 — NEXT

FIG.14G
SETTING SCREEN 3 OF MFP

SCAN SETTING SCREEN

ADDRESS  To example.mail.jp

SINGLE-SIDED DOCUMENT

FULL COLOR

PDF

DOCUMENT SIZE A4

RETURN   1407 — EXECUTE

FIG.14F
SETTING SCREEN 2 OF MFP

SCAN SETTING SCREEN

ADDRESS  To example.mail.jp

To example2.mail.jp

To example3.mail.jp

To example4.mail.jp

To example5.mail.jp

RETURN   1406 — NEXT

INFORMATION PROCESSING SYSTEM, METHOD AND STORAGE MEDIUM

BACKGROUND OF THE INVENTION

Field of the Invention

The present disclosure relates to a linkage technique in a plurality of information processing apparatuses.

Description of the Related Art

In recent years, there has been an increase in the number of image forming apparatuses (e.g., multifunction peripherals (MFPs)) installed in an office, having the function of cooperating with mobile terminals. For example, in a known technique, a mobile terminal transmits print data to an MFP and the MFP performs printing processing, and the mobile terminal acquires image data read by a scanner of the MFP. Japanese Patent Application Laid-Open No. 2017-108338 discusses a technique in which, in a case where an MFP performs a mail transmission process, an MFP receives transmission setting information indicating transmission settings from a mobile terminal, reflects the received transmission setting information, and executes mail transmission processing. As described above, a setting operation can be handed over between the MFP and the mobile terminal.

The conventional technique is, however, inconvenient for the user because the setting operation can be handed over between the mobile terminal and the MFP only at a limited timing. For example, the user cannot hand over the setting to the MFP unless a predetermined setting has been executed with the mobile terminal. Thus, in a case where the user starts executing a setting with a mobile terminal while the MFP is being used by another user, the user cannot immediately start executing an operation on the MFP when the MFP becomes available. In such a case, the user has to complete the setting with the mobile terminal, or to execute a setting with the MFP from the beginning after cancelling the setting executed with the mobile terminal. The present disclosure is directed to a technique in which a setting operation is handed over at a timing desired by the user.

SUMMARY OF THE INVENTION

According to an aspect of the present disclosure, a Web server configured to provide multiple operation screens involving screen transition and configured to be accessed from an information processing apparatus and an image forming apparatus, includes a first memory, and a first processor in communication with the first memory. The first processor performs registering an identifier of an operation screen operated by a user of the information processing apparatus via the information processing apparatus and an operation status of the operation in association with identification information about the user, and providing an operation screen to the image forming apparatus. In the providing, to the image forming apparatus, an operation screen in which the operation status is reflected is provided based on first information corresponding to the identifier of the operation screen and the operation status.

Further features of the present invention will become apparent from the following description of exemplary embodiments with reference to the attached drawings.

BRIEF DESCRIPTION OF THE DRAWINGS

FIG. 8 is a sequence diagram illustrating a series of processes which is executed by the information processing system according to the first exemplary embodiment of the present disclosure.

FIGS. 9A and 9B area flowchart illustrating processing which is executed by the application server according to the first exemplary embodiment of the present disclosure.

FIGS. 10A to 10D are each a flowchart illustrating processing which is executed by the management server according to the first exemplary embodiment of the present disclosure.

FIG. 12 illustrates an example of a sequence management table according to the first exemplary embodiment of the present disclosure.

FIG. 13 illustrates an example of a handover management table according to the first exemplary embodiment of the present disclosure.

FIGS. 14A to 14G illustrate examples of a user interface (UI) of an operation screen of a web application according to the first exemplary embodiment of the present disclosure.

DESCRIPTION OF THE EMBODIMENTS

Hereinafter, an exemplary embodiment embodying the present disclosure will be described with reference to the accompanying drawings.

The embodiments described hereinafter are not intended to limit the scope of the present disclosure described in the appended claims, and not all of the combinations of features described in the exemplary embodiments are required for the present disclosure. Each of the embodiments of the present invention described below can be implemented solely or as a combination of a plurality of the embodiments or features thereof where necessary or where the combination of elements or features from individual embodiments in a single embodiment is beneficial.

Figure 1:
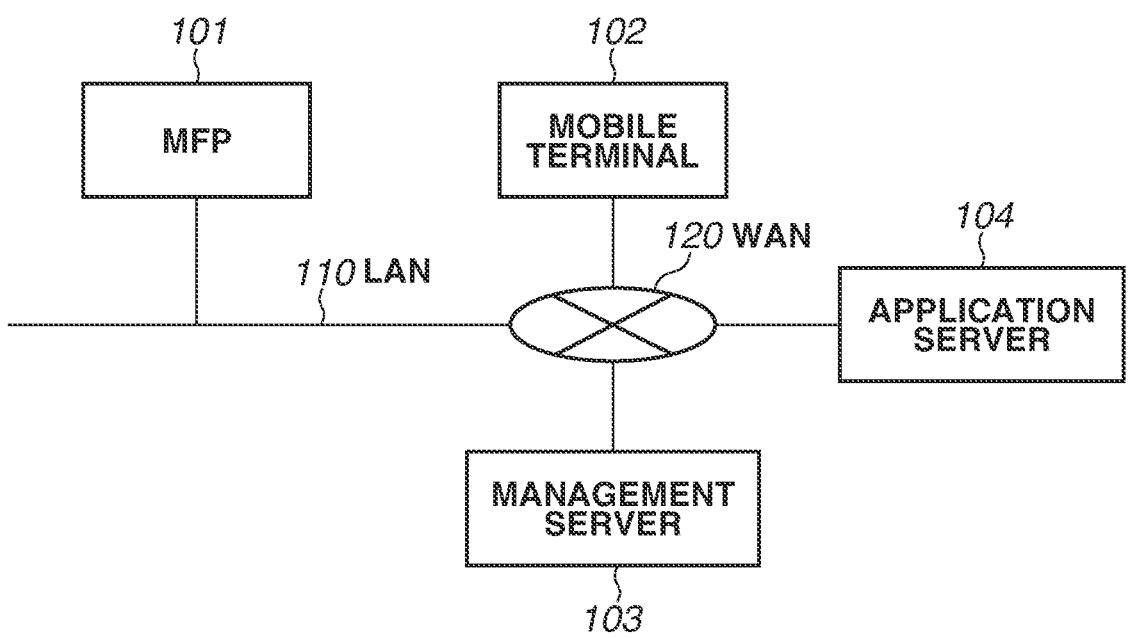
FIG. 1 is a diagram illustrating a configuration of an information processing system according to a first exemplary embodiment of the present disclosure.

A first exemplary embodiment of the present invention will be described below. FIG. 1 is a diagram illustrating an example of a system configuration of an information processing system according to the present exemplary embodiment. The information processing system includes a multifunction peripheral (MFP) 101 that is connected via a local area network (LAN) 110, a mobile terminal 102, a management server 103, and an application server 104 which are connected via a wide area network (WAN) 120. The apparatus connected via the LAN 110 and the apparatuses connected via the WAN 120 can communicate with each other via the respective networks. FIG. 1 illustrates an example of a typical network configuration, and the respective apparatuses can be connected to any one of the LAN 110 and the WAN 120.

The MFP 101 is an image forming apparatus having a scanner and a printer. In the present exemplary embodiment, an MFP is taken as an example of the image forming apparatus. However, the image forming apparatus is not limited to the MFP, and may be an apparatus having a single function. The MFP 101 includes a web browser as a software application. While only a single MFP is illustrated in FIG. 1, a plurality of MFPs may be included in the system. The mobile terminal 102 is a portable information processing apparatus. The mobile terminal 102 includes a web browser as a software application. In the present exemplary embodiment, a description will be provided on the assumption that the mobile terminal 102 is a terminal apparatus, such as a smartphone and a tablet terminal. However, the mobile terminal 102 is not limited thereto. The mobile terminal 102 can be any type of information processing apparatus that includes a web browser. The management server 103 is a server for managing information used for handing over the operation state of a web application provided by the application server 104 (described below) to the MFP 101 from the mobile terminal 102. The application server 104 is a Web server which provides the web application. The web application to be provided can be accessed from the MFP 101 and the mobile terminal 102. The number of application servers does not always have to be one, and more than one servers may exist depending on the number of web applications to be used.

Figure 2:
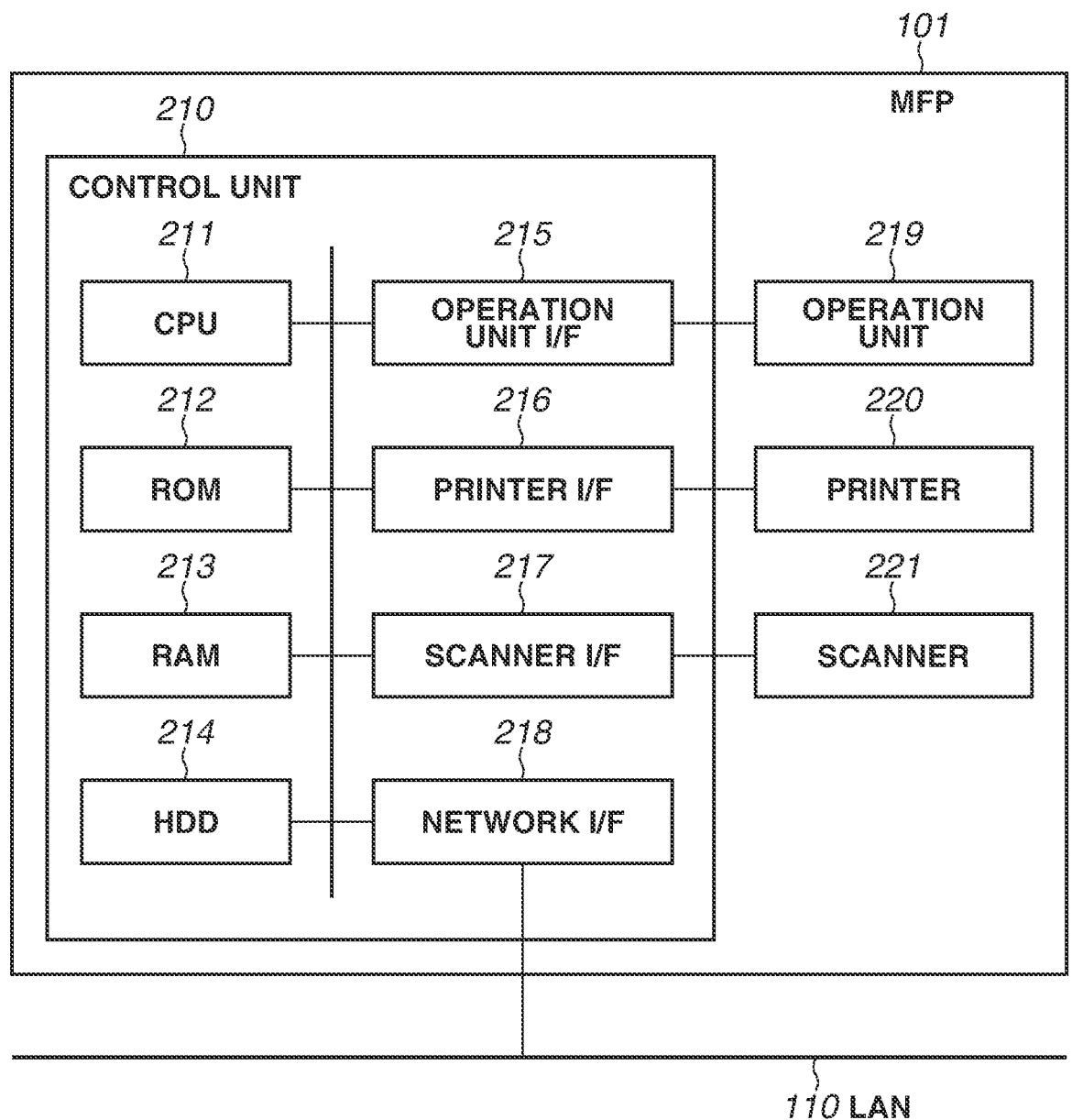
FIG. 2 is a block diagram illustrating a hardware configuration of a multifunction peripheral (MFP) according to the first exemplary embodiment of the present disclosure.

FIG. 2 is a block diagram illustrating a hardware configuration of the MFP 101. A control unit 210 including a central processing unit (CPU) 211 controls an entire operation of the MFP 101. The CPU 211 reads a control program stored in a read only memory (ROM) 212 or a hard disk drive (HDD) 214 and executes various types of control processing, such as reading control and transmission control. A random access memory (RAM) 213 is used as a temporary storage area, such as a main memory or a work area of the CPU 211. The HDD 214 stores image data and various programs.

An operation unit interface (I/F) 215 connects an operation unit 219 to the control unit 210. The operation unit 219 includes a liquid crystal display unit having a touch-panel function and a keyboard. A printer I/F 216 connects a printer 220 to the control unit 210. Image data to be printed by the printer 220 is transferred from the control unit 210 to the printer 220 via the printer I/F 216, and is printed on a recording medium by the printer 220. A scanner I/F 217 connects a scanner 221 to the control unit 210. The scanner 221 reads an image on a document, generates image data, and inputs the image data to the control unit 210 via the scanner I/F 217. A network I/F 218 connects the control unit 210 (MFP 101) to the LAN 110. The network I/F 218 transmits and receives various types of information to/from another apparatus connected to the LAN 110 or the WAN 120.

Figure 3:
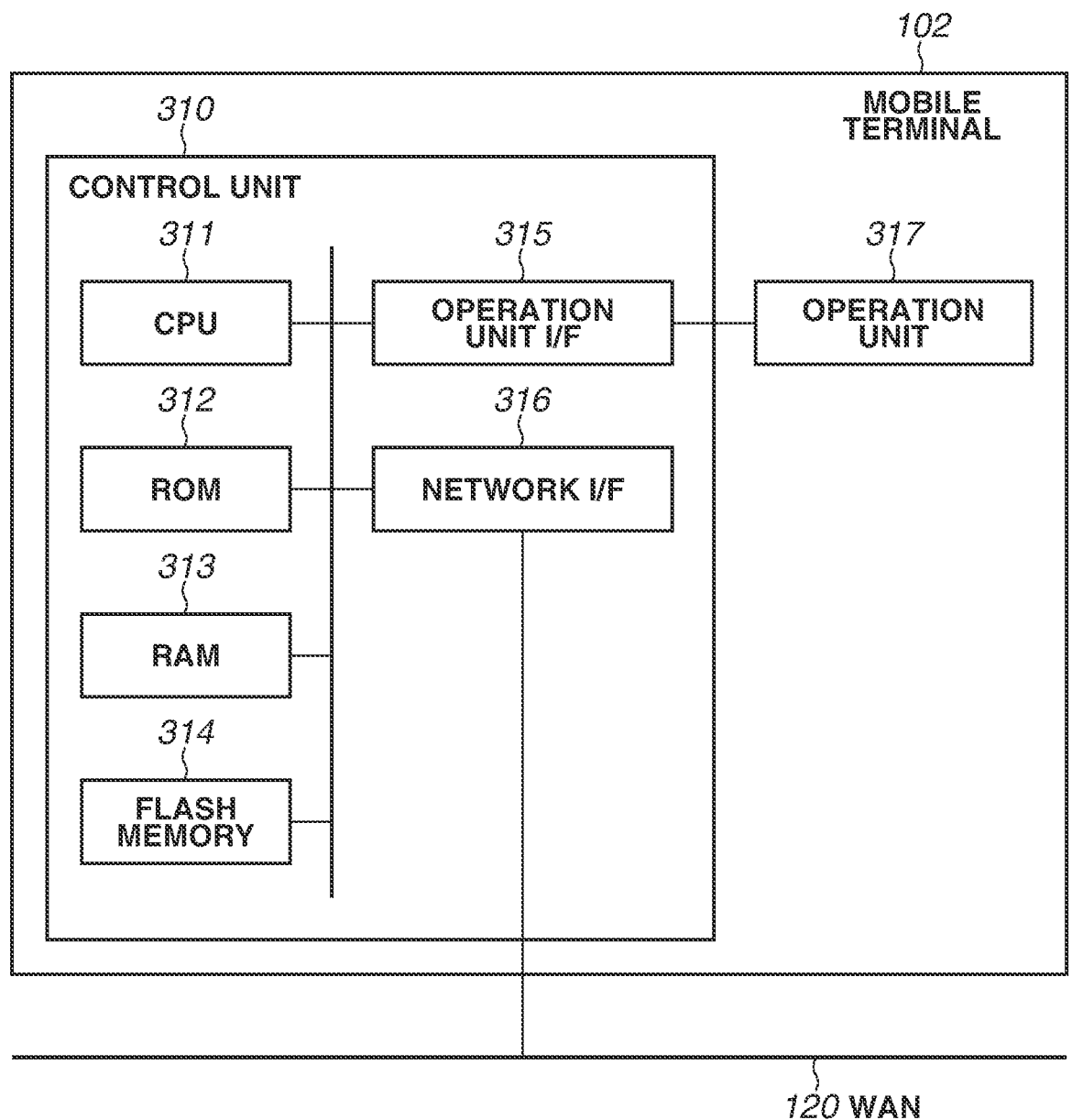
FIG. 3 is a block diagram illustrating a hardware configuration of a mobile terminal according to the first exemplary embodiment of the present disclosure.

FIG. 3 is a block diagram illustrating a hardware configuration of the mobile terminal 102. A control unit 310 including a CPU 311 controls an entire operation of the mobile terminal 102. The CPU 311 reads a control program stored in a ROM 312 or a flash memory 314 and executes various types of control processing. A RAM 313 is used as a temporary storage area, such as a main memory and a work area of the CPU 311. The flash memory 314 stores various programs and data. An operation unit I/F 315 connects an operation unit 317 to the control unit 310. The operation unit 317 includes a liquid crystal display unit having a touch-panel function. A network I/F 316 connects the control unit 310 to the WAN 120 or the LAN 110. The network I/F 316 is capable of executing wireless communication, and transmits and receives various types of information to/from another apparatus connected to the LAN 110 or the WAN 120 through wireless communication.

Figure 4:
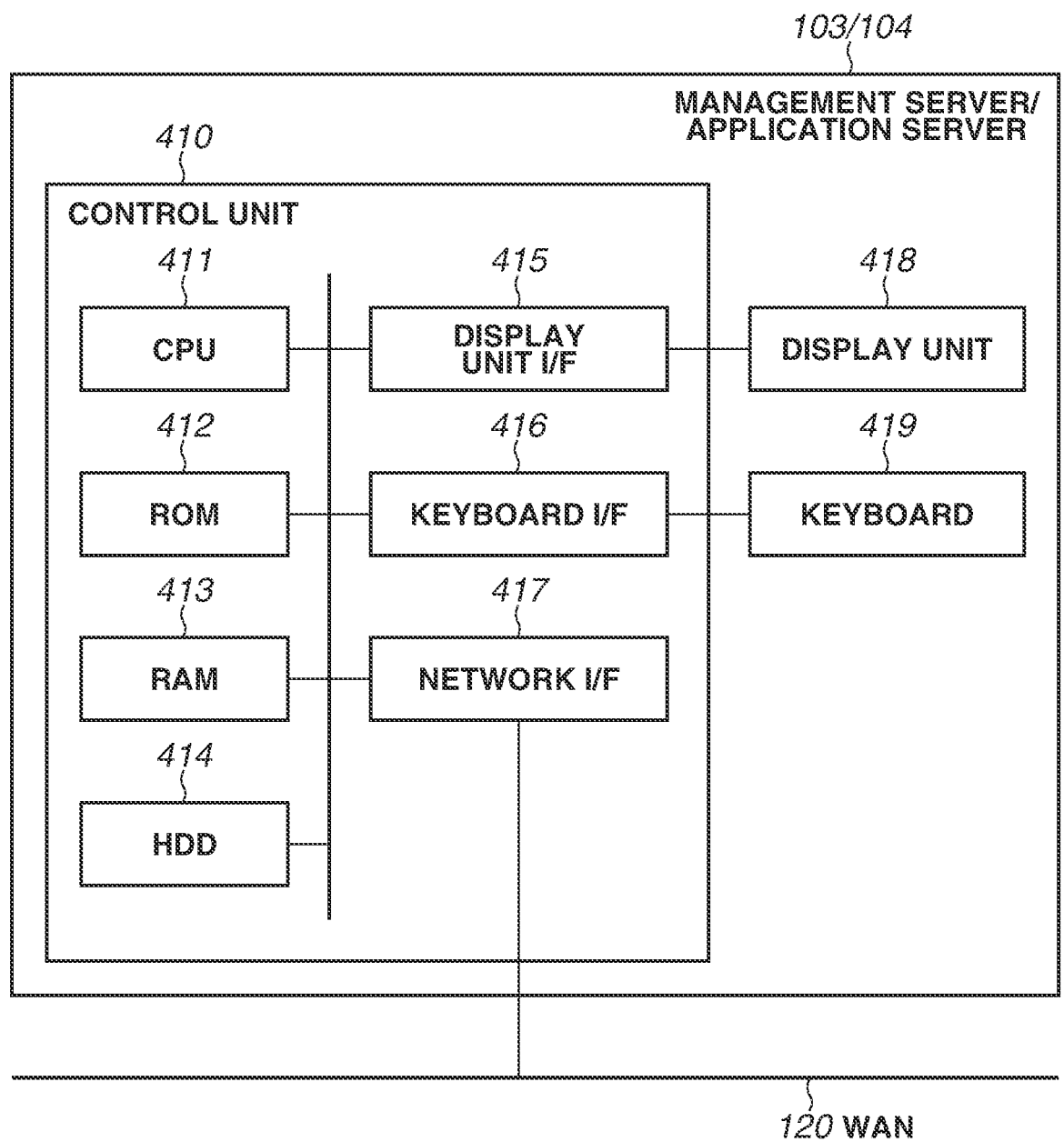
FIG. 4 is a block diagram illustrating a hardware configuration of a management server and an application server according to the first exemplary embodiment of the present disclosure.

FIG. 4 is a block diagram illustrating a hardware configuration of the management server 103 and the application server 104. A control unit 410 that includes a CPU 411 controls an entire operation of the apparatus. The CPU 411 reads a control program stored in a ROM 412 or a HDD 414 and executes various types of control processing. A RAM 413 is used as a temporary storage area, such as a main memory or a work area of the CPU 411. The HDD 414 stores various programs and data.

A display unit I/F 415 connects a display unit 418 to the control unit 410. A keyboard I/F 416 connects a keyboard 419 to the control unit 410. The CPU 411 recognizes a user instruction provided via the keyboard 419 and causes a screen displayed on the display unit 418 to transition based on the recognized instruction. A network I/F 417 connects the control unit 410 to the WAN 120 or the LAN 110. The network I/F 417 transmits and receives various types of information to/from another apparatus connected to the LAN 110 or the WAN 120.

Figure 5:
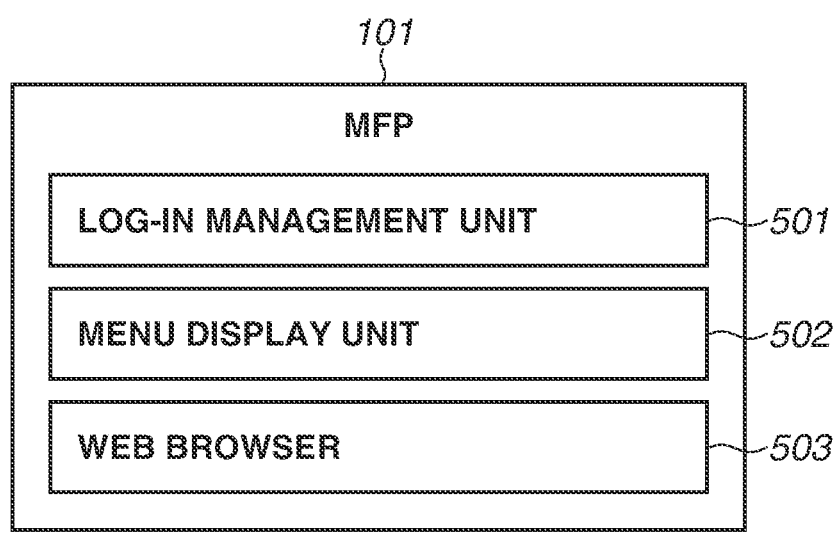
FIG. 5 is a block diagram illustrating a software configuration of the MFP according to the first exemplary embodiment of the present disclosure.

FIG. 5 is a block diagram illustrating a software configuration of the MFP 101 of the present exemplary embodiment. The CPU 211 reads a program stored in the ROM 212 or the HDD 214 of the MFP 101 to the RAM 213, and executes the program to realize each of the software function blocks illustrated in FIG. 5.

A log-in management unit 501 manages user authentication that is executed when the user logs into the MFP 101. A menu display unit 502 displays a menu screen on the operation unit 219. The menu display unit 502 displays a button (i.e., application button) for calling an application on the menu screen. The application button is used for calling various functions, such as an application and a web application installed in the MFP 101.

A web browser 503 accesses a Web server to acquire web content. In addition, the MFP 101 may have other functions that are not illustrated in FIG. 5.

Figure 6:
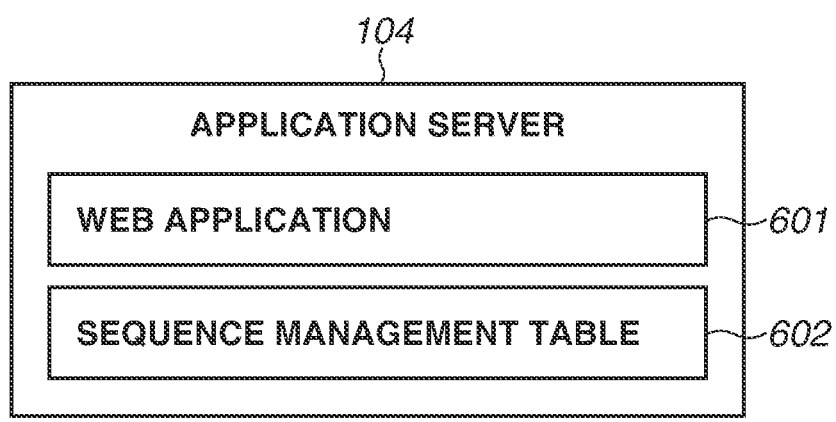
FIG. 6 is a block diagram illustrating a software configuration of the application server according to the first exemplary embodiment of the present disclosure.

FIG. 6 is a block diagram illustrating a software configuration of the application server 104 according to the present exemplary embodiment. Each of the software function blocks illustrated in FIG. 6 is realized by the CPU 411 reading a program stored in the ROM 412 or the HDD 414 of the application server 104 to the RAM 413 and executing the program. A web application 601 is a program operating on the application server 104. The web application 601 provides an operation screen of the web application 601 to the MFP 101 and/or the mobile terminal 102, and the MFP 101 and the mobile terminal 102 display the operation screen on the web browser. The MFP 101 and the mobile terminal 102 display the operation screen of the web application 601 by accessing the application server 104, receive a user operation through the operation screen, and return the received operation information to the application server 104. If the web application 601 serves as a web application that instructs the MFP 101 to execute scanning, the user accesses the application server 104 via the web browser and executes setting in a scan setting operation screen provided by the web application 601. In the present exemplary embodiment, the user accesses the application server 104 for a plurality of times to execute setting with a plurality of operation screens. This allows the user to provide a scan execution instruction with a scan execution operation screen provided by the web application 601.

A sequence management table 602 is used for managing a state (e.g., operation status) of a series of processes (hereinafter, referred to as "sequence") in which the web application 601 is operated by the user via the web browser. The sequence refers to a procedure from a start to an end of the processing set for each web application, involving screen transition. For example, a procedure from execution of scan setting to provision of an execution instruction is regarded as a sequence, in a case of a scanning application. In addition, the application server 104 may have other functions that are not illustrated in FIG. 6.

FIG. 12 is a diagram illustrating an example of the sequence management table 602 according to the present exemplary embodiment. The sequence management table 602 includes four columns 1201 to 1204.

A SequenceID column 1201 includes a value for defining identification information (hereinafter, referred to as "sequence ID") for uniquely identifying sequence information. The sequence information includes user information and information indicating an operation state of the sequence associated with the user. The SequenceID column 1201 and the operation state of the sequence are associated with each other. The value included in the SequenceID column 1201 also serves as an identifier that uniquely specifies a row of the sequence management table 602. Hereinafter, the value of the SequenceID column 1201 is used for specifying a row of the sequence management table 602. For example, a row having "s001" as a value of the SequenceID column 1201 is described as "row s001".

A SequenceData column 1202 indicates an operation state at a time point indicated by the SequenceID column 1201 in the sequence. In the SequenceData column 1202, information necessary for specifying and/or recovering the operation state of the sequence (hereinafter, referred to as "sequence operation state data") is saved. Examples of the necessary information include an identifier for an operation screen and an operation status including a setting value set with the operation screen.

A UserID column 1203 includes an identifier of the user who operates the web application 601 in the sequence (hereinafter, referred to as "user ID"). In the present exemplary embodiment, a description will be provided below based on the assumption that the web application 601 and the MFP 101 use the same external authentication server (not illustrated). However, the external authentication server does not always have to be used. Any authentication method can be used as long as it is possible to recognize that the user ID of the user information used for executing authentication in the web application 601 and the user ID of the user information used for executing authentication in the MFP 101 are identical and that the authenticated user for the web application 601 and the authenticated user for the MFP 101 are identical to each other.

A HandoverID column 1204 includes an identifier for uniquely specifying a row of the below-described handover management table 702 (hereinafter, referred to as "handover ID"). The sequence management table 602 and the handover management table 702 are associated with each other by the Handover ID column 1204.

Figure 7:
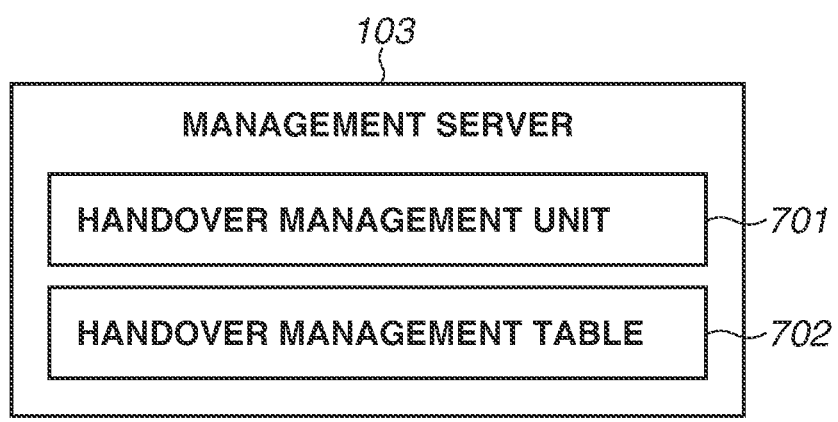
FIG. 7 is a block diagram illustrating a software configuration of the management server according to the first exemplary embodiment of the present disclosure.

FIG. 7 is a block diagram illustrating a software configuration of the management server 103 according to the present exemplary embodiment. The CPU 411 reads a program stored in the ROM 412 or the HDD 414 of the management server 103 to the RAM 413, and executes the program to realize each of the software function blocks. A handover management unit 701 manages the information for handing over the sequence information for the web application 601 to the MFP 101 from the mobile terminal 102 (hereinafter, referred to as "handover information"). A handover management table 702 is a table for recording the handover information. The handover management unit 701 and the handover management table 702 do not necessarily have to be arranged on the management server 103, but may be arranged on the application server 104. In addition, the management server 103 may have other functions that are not illustrated in FIG. 7.

FIG. 13 is a diagram illustrating an example of the handover management table 702 according to the present exemplary embodiment. The handover management table 702 includes five columns 1301 to 1305.

A HandoverID column 1301 includes values defining an identifier for uniquely identifying handover information, and corresponds to the HandoverID column 1204 of the sequence management table 602. The values included in the HandoverID column 1301 also serve as an identifier for uniquely specifying a row of the handover management table 702. In the below-described exemplary embodiment, a value of the HandoverID column 1301 is used for specifying a row thereof. For example, a row having "h001" as a value of the Handover ID column 1301 is described as "row h001".

A URL column 1302 includes a uniform resource locator (URL) which is to be accessed from the web browser 503 of the MFP 101 when the sequence information about the web application 601 is handed over to the MFP 101 (hereinafter, referred to as "handover URL"). The information included in the URL column 1302 is a URL for the web application 601, and the URL is different for each web application. In the present exemplary embodiment, a URL for the web application is used in which a value in the sequence ID column 1201 is attached, as a query string, to the URL of the web application, as an example of the handover URL. The value in the sequence ID column 1201 indicates the operation state of the sequence, and thus, the operation state of the sequence of the target web application can be specified and recovered with the handover URL.

A Non-MFP-Accessed column 1303 includes information indicating the last date and time when the web application 601 of the application server 104 is accessed from a web browser different from the web browser 503 of the MFP 101 in the corresponding sequence. An MFP-Accessed column 1304 includes information indicating the last date and time when the web application 601 is accessed from the web browser 503 of the MFP 101 in the corresponding sequence. The absence of a value in a field in an MFP-Accessed column 1304 indicates that the web application 601 has not been accessed from the web browser 503 of the MFP 101 in the corresponding sequence.

A userID column 1305 includes a user ID, which is used for specifying the handover information associated with the logged-in user.

Figure 14A:
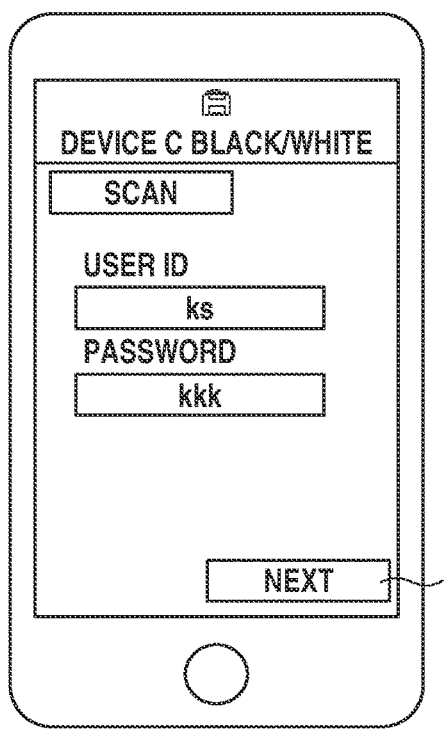

An overview of the operation setting handover processing according to the present exemplary embodiment will be described with reference to FIGS. 14A to 14G before the sequence diagram in FIG. 8 is described. In the present exemplary embodiment, a description will be provided using an example in which the mobile terminal 102 and the MFP 101 can operate a web application capable of transmitting scanned data to a destination specified by a user operation, and the user executes the settings of the web application with a screen of the mobile terminal 102 or the MFP 101. FIGS. 14A to 14D are diagrams illustrating setting screen transition in the mobile terminal 102. When the user inputs user information on a screen of FIG. 14A and presses a NEXT button 1401, the screen is caused to transition to a setting screen 1 in FIG. 14B. When a NEXT button 1402 is pressed after the user executes the settings on the setting screen 1, the screen is caused to transition to a setting screen 2 in FIG. 14C. Similarly, the screen is caused to transition to a setting screen 3 in FIG. 14D when a NEXT button 1403 is pressed, and a scan execution instruction is transmitted to the MFP 101 when an EXECUTE button 1404 is pressed. FIGS. 14E to 14G are diagrams illustrating the setting screen transition in the MFP 101. The setting screens are similar to those illustrated in FIGS. 14B to 14D, and setting screen transition is performed in a similar manner. For example, the user executes the settings with the setting screen 1, illustrated in FIG. 14B, on the mobile terminal 102, and presses the NEXT button 1402 to cause the screen to transition to the setting screen 2 illustrated in FIG. 14C. When the user logs in to the MFP 101 with the setting screen 2 being displayed, the user can continuously execute the settings with the setting screen 2 of FIG. 14F displayed on the MFP 101. Similarly, the user can continue to execute the settings on the MFP 101 from the setting screen displayed on the mobile terminal 102 in a case where the setting screen 1 or 3 is displayed on the mobile terminal 102. When the user advances the handed-over setting screen 2 to a setting screen 3 of FIG. 14G on the MFP 101 and presses an EXECUTE button 1407, the MFP 101 executes scanning and transmits a mail.

FIG. 8 is a sequence diagram illustrating a series of processes cooperatively executed by the MFP 101, the mobile terminal 102, the management server 103, and the application server 104 of the present exemplary embodiment. In this sequence diagram, a description will be provided using an example in which, after the web application 601 provided by the application server 104 is operated with the mobile terminal 102, the sequence is handed over to the MFP 101.

The application server 104 provides the web application 601, and the web application 601 is called by the MFP 101 and the mobile terminal 102. The management server 103 is used for managing information for handing over the operation state of the web application 601 to the MFP 101 from the mobile terminal 102.

First, in step S801, the mobile terminal 102 receives a user instruction and transmits a request including a user authentication request to the application server 104, i.e., the user presses a NEXT button 1401 in FIG. 14A. At this time, the user accesses the web application 601 using the URL as the start of the sequence. The URL as the start of the sequence may be registered in the menu screen of the mobile terminal 102 or may be called from a dedicated application installed in the mobile terminal 102.

In step S802, the application server 104 executes user authentication by using the user information including the user ID set by the user. In the present exemplary embodiment, an external authentication server executes authentication, as an example of the authentication method. In step S803, the application server 104 newly registers sequence information in the sequence management table 602. At this time, the sequence information includes sequence operation state data and an authenticated user ID. In step S804, the application server 104 instructs the management server 103 to register handover information based on the sequence information. At this time, as the handover information, the application server 104 transmits the URL of the web application 601 that is being executed by the mobile terminal 102 and the authenticated user ID. In step S805, the management server 103 newly registers the handover information in the handover management table 702. In step S806, the application server 104 executes processing for the request in step S801. Herein, "request" refers to, for example, processing for requesting the operation screen in the sequence of the web application 601 (i.e., the operation of the user pressing the NEXT button 1401 in FIG. 14A to input an acquisition request for a next screen). The application server 104 specifies a state in the sequence from the sequence information registered in step S803, and executes a process appropriate for the request in step S801 (i.e., a process for generating a screen illustrated in FIG. 14B in response to a screen acquisition request). In step S807, the application server 104 updates the sequence management table 602 with the sequence information in which the process executed in step S806 is reflected. More specifically, the application server 104 additionally updates the information in the SequenceData column 1202 of the sequence management table 602 in response to the request. In step S808, the application server 104 returns a response to the request in step S801 to the mobile terminal 102 (displays the screen of FIG. 14B).

Figure 14B:
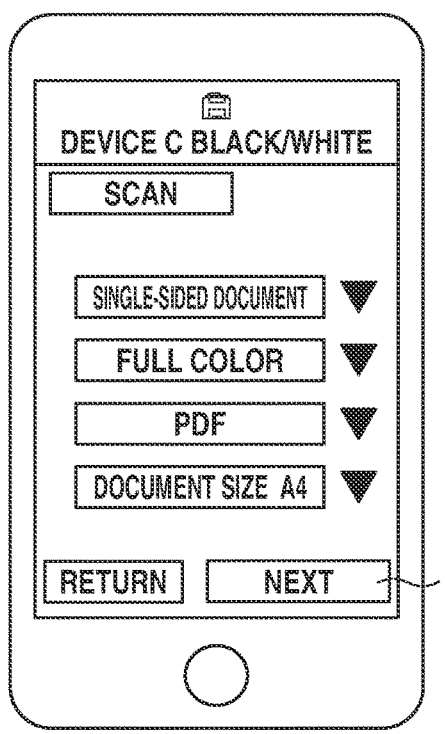

In step S809, the mobile terminal 102 receives a user instruction and transmits a next request to the application server 104 (the user executes the settings on the setting screen 1 in FIG. 14B and presses the NEXT button 1402). This request includes the user information and information indicating the sequence.

In step S810, the application server 104 transmits access information (described below) to the management server 103. In step S811, as the management server 103 receives the access information, the management server 103 updates the handover information in the handover management table 702. More specifically, the management server 103 updates a value in a Non-MFP-Accessed column 1303 of the handover management table 702 with a system time.

Figure 14C:
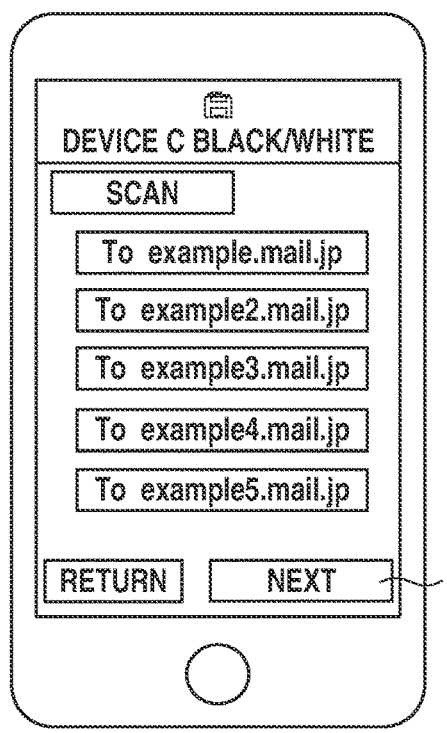
Figure 14D:
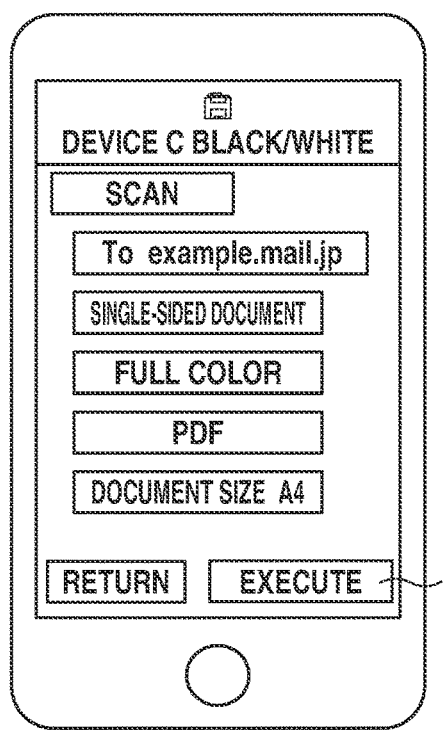

In step S812, the application server 104 executes a process for the request in step S809 (recording of the settings, set with the setting screen 1 as illustrated in FIG. 14B, such as "single-sided document" and "full-color", and generation of the setting screen 2 as illustrated in FIG. 14C). The application server 104 specifies a state in the sequence from the information indicating the sequence included in the request and executes a process appropriate for the request. In step S813, the application server 104 updates the sequence management table 602 with the sequence information in which the process executed in step S812 is reflected (i.e., setting information set with the setting screen 1 in FIG. 14B, such as "single-sided document" and "full-color"). In step S814, the application server 104 returns a response to the request in step S809 to the mobile terminal 102 (i.e., displays the screen of FIG. 14C).

The processes in steps S809 to S814 are executed every time the mobile terminal 102 receives a user operation executed on the web browser and transmits a request by accessing the application server 104 (hereinafter, a description will be provided based on the assumption that the setting screen 2 of the FIG. 14C is being displayed on the mobile terminal 102).

Subsequently, a description will be provided of the processing based on the assumption that an information processing apparatus operated by the user is changed to the MFP 101 from the mobile terminal 102.

In step S815, as the user logs into the MFP 101, the MFP 101 receives the user information and executes user authentication. In the present exemplary embodiment, the MFP 101 executes authentication by using the same external authentication server as the one used by the application server 104 in step S802. In step S816, the MFP 101 acquires the handover information associated with the user information about the user who has logged in, in step S815 (hereinafter, referred to as "logged-in user") from the handover management table 702 in the management server 103. In step S817, the MFP 101 determines whether the handover information for the logged-in user exists. If the handover information exists (YES in step S817), the processing proceeds to step S818. If the handover information does not exist (NO in step S817), the processing proceeds to step S828.

In step S828, the MFP 101 displays a menu screen on which application buttons are arranged.

In step S818, the MFP 101 starts the web browser 503 and accesses the handover URL included in the handover information (i.e., an acquisition request for the setting screen 2 in FIG. 14F).

In step S819, the application server 104 transmits the access information to the management server 103. In step S820, the management server 103 updates the handover information in the handover management table 702. More specifically, the management server 103 updates a value in an MFP-Accessed column 1304 with a system time.

In step S821, the application server 104 executes a process for the request in step S818. The application server 104 refers to the sequence management table 602 based on the sequence information included in the handover information, specifies a state (such as the operation screen and the operation history) in the sequence, and executes the process appropriate for the request (in response to the acquisition request for the setting screen 2 illustrated in FIG. 14F, the application server 104 generates the setting screen 2 in FIG. 14F, in which the operation history is retained and reflected. In step S822, the application server 104 updates the sequence management table 602 with the sequence information in which the process executed in step S821 is reflected.

In step S823, the application server 104 determines whether the sequence is completed. If the sequence is completed (YES in step S823), the processing proceeds to step S824. If the sequence has not been completed (NO in step S823), the processing proceeds to step S827.

In step S827, the application server 104 returns a response to the request in step S818 to the MFP 101 (i.e., displays the screen of FIG. 14F). The processes in steps S818 to S827 are executed every time the MFP 101 receives a user operation performed on the web browser 503 and transmits a request to the application server 104. It is assumed that the request process in step S818 for the second and subsequent times is executed based on the user instruction provided via the MFP 101. (For example, the user presses the NEXT button 1406 on the setting screen 2 in FIG. 14F to request acquisition of the setting screen 3 in FIG. 14G. The user then presses the EXECUTE button 1407 on the setting screen 3 in FIG. 14G to request execution of the scanning process using the MFP 101.) In step S823, if the sequence is completed (i.e., if the user has pressed the EXECUTE button 1407 on the setting screen 3 in FIG. 14G in step S818), the processing proceeds to step S824. In step S824, the application server 104 instructs the management server 103 to delete the handover information. In step S825, the management server 103 deletes the corresponding handover information from the handover management table 702.

In step S826, the application server 104 deletes the sequence information from the sequence management table 602.

Here, if the handover information related to the user who has logged in to the MFP 101 exists, the web browser has been automatically started in step S818. However, the present exemplary embodiment is not limited thereto. A button for calling the handover information may be displayed on the menu screen as one of the application buttons, so that the web browser is started when the user presses that button.

The effect of the sequence diagram will be described. The user can hand over the operation state of the web application 601 partway operated using the mobile terminal 102 by logging in to the MFP 101.

Figure 9B:
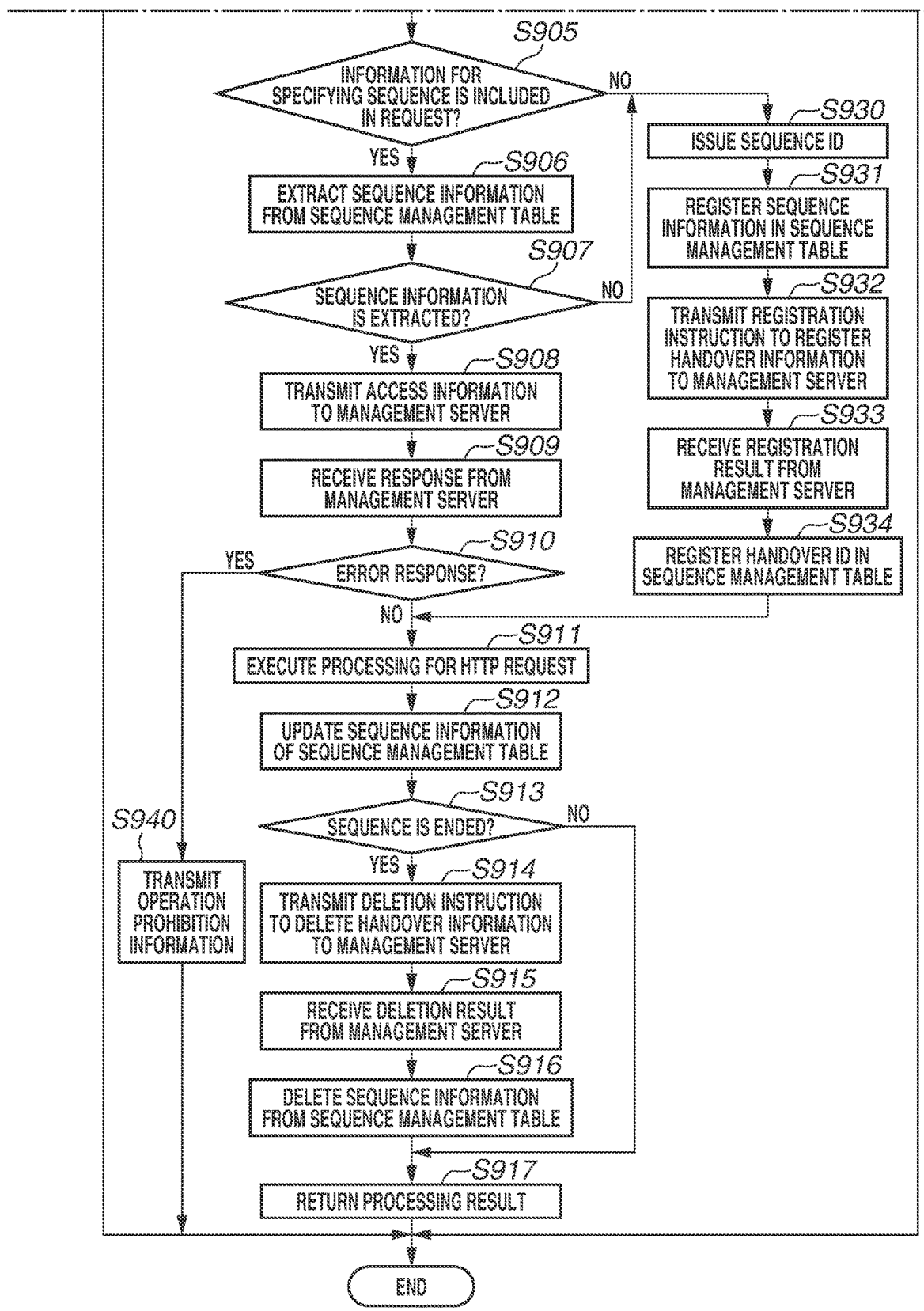

FIGS. 9 A and B are a flowchart illustrating processing which is executed by the application server 104 according to the present exemplary embodiment. A description will be provided of the processing from reception of a request from the web browser of the MFP 101 or the mobile terminal 102 to a return of a response. The flowchart in FIGS. 9 A and B corresponds to the processing which is executed by the application server 104 in the series of processes illustrated in the sequence diagram in FIG. 8. The CPU 411 reads a program stored in the HDD 414 of the application server 104 to the RAM 413, and executes the program to execute respective operations in steps of the flowchart in FIGS. 9 A and B.

In step S901, the web application 601 receives a hypertext transfer protocol (HTTP) request from the web browser of the MFP 101 or the mobile terminal 102. Hereinafter, in the description of this flowchart, the HTTP request received in step S901 will be simply referred to as "request". In step S902, the web application 601 determines whether the request is a user authentication request. If the request is the user authentication request (YES in step S902), the processing proceeds to step S950. If the request is not the user authentication request (NO in step S902), the processing proceeds to step S903.

In step S903, the web application 601 determines whether a request source has been user authenticated. More specifically, the web application 601 makes the determination based on whether the request includes information capable of identifying the user. For example, the request may include authentication information in the cookie or information capable of identifying the user in the HTTP header. If the request source has been user authenticated (YES in step S903), the processing proceeds to step S904. If the request source has not been authenticated (NO in step S903), the processing proceeds to step S920. Hereinafter, in the description of this flowchart, a user determined to be the authenticated user in step S903 will be referred to as "logged-in user".

In step S904, the web application 601 identifies the type of request source apparatus (i.e., the MFP 101 or the mobile terminal 102).

In step S905, the web application 601 determines whether the request includes the information for specifying the sequence of the web application 601. In the present exemplary embodiment, a description will be provided using an example in which such a determination is made based on whether a sequence ID is attached to the request URL as a query string. However, another method may also be employed. For example, the information capable of specifying the sequence may be included in the cookie or the HTTP header. If the request includes the information that specifies the sequence (YES in step S905), the processing proceeds to step S906. If the request does not include the information (NO in step S905), the processing proceeds to step S930.

In step S906, the web application 601 extracts the sequence information including a sequence ID conforming to the sequence ID included in the query attached to the request URL from the sequence management table 602. More specifically, the web application 601 extracts a record having a value conforming to a value of the sequence ID included in the query attached to the request URL, from the SequenceID column 1201. In step S907, the web application 601 determines whether the sequence information is extracted in step S906. If the sequence information is extracted (YES in step S907), the processing proceeds to step S908. If the sequence information is not extracted (NO in step S907), the processing proceeds to step S930.

In step S908, the web application 601 transmits the access information to the handover management unit 701 of the management server 103. The access information includes the type of request source apparatus identified in step S903 and the handover ID included in the sequence information extracted in step S906 (i.e., a value in the HandoverID column 1204). In step S909, the web application 601 receives a response to the operation in step S908 from the handover management unit 701 of the management server 103. In step S910, the web application 601 determines whether an error is indicated in the response received in step S909. If an error is indicated in the response (YES in step S910), the processing proceeds to step S940. If an error is not indicated in the response (NO in step S910), the processing proceeds to step S911.

In step S911, the web application 601 specifies an operation state in the sequence from the sequence operation state data included in the sequence information extracted in step S906 (i.e., the information in the SequenceData column 1202), and executes the process appropriate for the request. In step S912, the web application 601 updates the sequence operation state data in the sequence management table 602 with the state of the sequence in which the process executed in step S911 is reflected.

In step S913, the web application 601 determines whether the target sequence has been completed to the end, based on the sequence operation state data. If the sequence has been completed (YES in step S913), the processing proceeds to step S914. If the sequence has not been completed (NO in step S913), the processing proceeds to step S917.

In step S914, the web application 601 transmits a handover information deletion instruction to delete the handover information to the handover management unit 701 of the management server 103. Here, the web application 601 includes, in the deletion instruction to be transmitted, the handover ID in the sequence information extracted in step S906 (a value in the HandoverID column 1204) as the information for specifying a deletion target. In step S915, the web application 601 receives a response to the deletion instruction in step S914 from the handover management unit 701 of the management server 103. In step S916, the web application 601 deletes the sequence information from the sequence management table 602. The sequence information to be deleted is sequence information having a sequence ID conforming to the sequence ID included in the query attached to the request URL in the SequenceID column 1201.

In step S917, in response to the request in step S901, the web application 601 returns a result of the process in step S911 to the request source apparatus, and ends the processing.

In step S920, in response to the request in step S901, the web application 601 returns information for a user authentication screen to the request source apparatus and ends the processing.

In step S930, the web application 601 newly issues a sequence ID. In step S931, the web application 601 newly registers sequence information having the sequence ID issued in step S930 in the sequence management table 602. The issued sequence ID, the current sequence operation state data, and the user ID of the logged-in user are respectively registered in the SequenceID column 1201, the SequenceData column 1202, and the UserID column 1203. At this point, the HandoverID column 1204 is blank.

In step S932, the web application 601 transmits a handover information registration instruction to register the handover information to the handover management unit 701 of the management server 103. Here, the web application 601 includes, in the registration instruction to be transmitted, the handover URL (the URL of the web application 601 to which the sequence ID is attached as a query), the user ID of the logged-in user, and the type of request source apparatus identified in step S903, as the handover information. In step S933, the web application 601 receives a response to the registration instruction in step S932 from the handover management unit 701 of the management server 103. The response includes the handover ID for specifying the registered handover information. In step S934, the web application 601 registers the handover ID received in step S933 in the HandoverID column 1204 of the sequence management table 602. Next, the web application 601 advances the processing to step S911 and executes the subsequent processes.

In step S940, in response to the request in step S901, the web application 601 returns error information for prohibiting the subsequent operations to the request source apparatus and ends the processing.

In step S950, the web application 601 executes user authentication. In the present exemplary embodiment, an authentication method using an external authentication server is used as an example of the authentication method, as described with reference to FIG. 8. In step S951, the web application 601 returns a result of the user authentication to the request source apparatus in response to the request in step S901, and ends the processing.

The effect of the flowchart in FIGS. 9 A and B will be described. The application server 104 is capable of registering the user information and the sequence operation state of the web application 601 in association with each other, and is capable of acquiring and updating the registered information every time the user accesses the web application 601 via the web browser of the MFP 101 or the mobile terminal 102. The application server 104 is capable of notifying the registered information to the management server 103.

FIGS. 10A to 10D are flowcharts each illustrating processing of the management server 103 according to the present disclosure. The CPU 411 reads a program stored in the HDD 414 of the management server 103 to the RAM 413, and executes the program to execute operations in the respective steps of the flowcharts in FIGS. 10A to 10D.

FIG. 10A is a flowchart illustrating the processing which is executed when the management server 103 receives the handover information registration instruction from the application server 104. The flowchart in FIG. 10A corresponds to the processing that is executed by the management server 103 in steps S804 to S805 of the sequence diagram in FIG. 8.

In step S1001, the handover management unit 701 receives the handover information registration instruction from the application server 104. The registration instruction includes the handover URL, the user ID, and the type of request source apparatus identified in step S903.

In step S1002, the handover management unit 701 newly issues a handover ID. In step S1003, the handover management unit 701 newly registers the handover information having the handover ID issued in step S1002 in the handover management table 702. The handover ID, the handover URL, and the user ID are respectively registered in the HandoverID column 1301, the URL column 1302, and the UserID column 1305. A system time is registered in the MFP-Accessed column 1304 if the request source apparatus is the MFP 101, and the system time is registered in the Non-MFP-Accessed column 1303 if the request source apparatus is not the MFP 101.

In step S1004, the handover management unit 701 transmits to the application server 104 a response indicating the completion of registration in response to the registration instruction in step S1001, and ends the processing. Here, the response includes the handover ID issued in step S1002.

FIG. 10B is a flowchart illustrating the processing which is executed when the management server 103 receives the access information from the application server 104. The flowchart in FIG. 10B corresponds to the processing that is executed by the management server 103 in steps S810 to S811 and steps S819 to S820 of the sequence diagram in FIG. 8.

In step S1010, the handover management unit 701 receives the access information from the application server 104. The access information includes the handover ID and the type of request source apparatus identified in step S903. In step S1011, the handover management unit 701 extracts the handover information having the handover ID conforming to the received handover ID in the HandoverID column 1301 from the handover management table 702.

In step S1012, the handover management unit 701 determines whether the handover information is extracted in step S1011. If the handover information is extracted (YES in step S1012), the processing proceeds to step S1013. If the handover information cannot be extracted (NO in step S1012), the processing proceeds to step S1030. In step S1030, the handover management unit 701 transmits an error indicating non-existence of the handover information to the application server 104 and ends the processing.

In step S1013, the handover management unit 701 identifies whether the type of apparatus as a transmission source of the access information received from the application server 104 in step S1010 is the MFP. If the type of apparatus is the MFP (YES in step S1013), the processing proceeds to step S1014. If the type of apparatus is not the MFP (NO in step S1013), the processing proceeds to step S1015.

In step S1014, the handover management unit 701 registers the system time in the field of the MFP-Accessed column 1304 corresponding to the handover information extracted from the handover management table 702 in step S1011. The processing then proceeds to step S1017.

In step S1015, the handover management unit 701 determines whether the field of the MFP-Accessed column 1304 corresponding to the handover information extracted in step S1011 is blank (no value is set). If the corresponding field of the MFP-Accessed column 1304 is blank (YES in step S1015), the processing proceeds to step S1016. If the corresponding field of the MFP-Accessed column 1304 is not blank (NO in step S1015), the processing proceeds to step S1020. In step S1020, the handover management unit 701 returns an error indicating prohibition of the subsequent operations to the application server 104 and ends the processing.

In step S1016, the handover management unit 701 sets a system time to the field of the Non-MFP-Accessed column 1303 corresponding to the handover information extracted in step S1011 and updates the handover management table 702.

In step S1017, the handover management unit 701 transmits a response indicating that the access information is normally received in step S1010 to the application server 104, and ends the processing.

FIG. 10C is a flowchart illustrating the processing which is executed when the management server 103 receives the handover information deletion instruction from the application server 104. The processing in flowchart in FIG. 10C corresponds to the processing that the management server 103 executes in steps S824 to S825 of the sequence diagram in FIG. 8.

In step S1040, the handover management unit 701 receives the handover information deletion instruction from the application server 104. The deletion instruction includes the handover ID. In step S1041, the handover management unit 701 determines whether the handover management table 702 includes handover information that the handover management unit 701 is instructed to delete. More specifically, the handover management unit 701 determines whether there is a record, in the HandoverID column 1301, having a value conforming to the value of the handover ID received in step S1040. If the handover information exists (YES in step S1041), the processing proceeds to step S1042. If the handover information does not exist (NO in step S1041), the processing proceeds to step S1050. In step S1050, the handover management unit 701 transmits a response indicating that handover information to be deleted does not exist to the application server 104, and ends the processing.

In step S1042, the handover management unit 701 deletes a record having a value conforming to the value of the handover ID received in step S1040 in the HandoverID column 1301 from the handover management table 702.

In step S1043, the handover management unit 701 notifies the application server 104 that the handover information has been deleted, as a response to the deletion instruction in step S1040, and ends the processing.

FIG. 10D is a flowchart illustrating the processing which is executed when the management server 103 receives a handover information acquisition request from the MFP 101. The flowchart in FIG. 10D corresponds to the processing that is executed by the management server 103 in step S816 of the sequence diagram in FIG. 8.

In step S1060, the handover management unit 701 receives the handover information acquisition request from the MFP 101. The user ID is included in the acquisition request.

In step S1061, the handover management unit 701 refers to the handover management table 702, and extracts the handover information corresponding to the user ID included in the acquisition request.

In step S1062, the handover management unit 701 determines whether the handover information has been extracted in step S1061. If the handover information has been extracted (YES in step S1062), the processing proceeds to step S1063. If the handover information cannot be extracted (NO in step S1062), the processing proceeds to step S1064.

In step S1063, the handover management unit 701 transmits the extracted handover information to the MFP 101, as a response to the acquisition request in step S1060, and ends the processing.

In step S1064, the handover management unit 701 transmits a notification that no handover information exists to the MFP 101, as a response to an operation in step S1060, and ends the processing.

The effects of the flowcharts in FIGS. 10A to 10D will be described. The sequence information registered in the management server 103 can be updated by the instruction from the web application. The management server 103 can provide the sequence information according to the acquisition request from the MFP 101.

Figure 11:
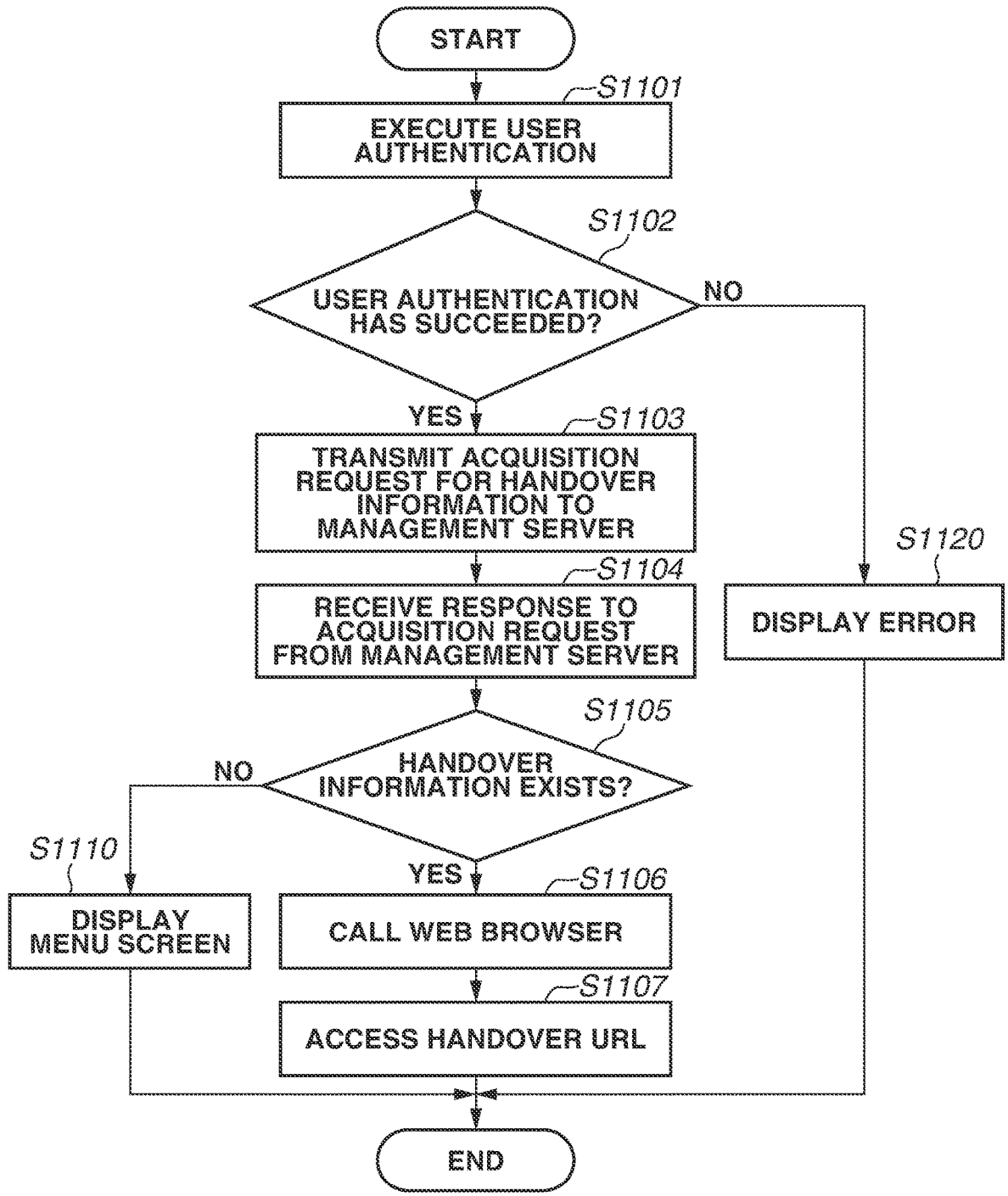
FIG. 11 is a flowchart illustrating processing which is executed by the MFP according to the first exemplary embodiment of the present disclosure.

FIG. 11 is a flowchart illustrating processing from a process of logging in to a process of displaying a menu screen, which is executed by the MFP 101, according to the present disclosure. The flowchart in FIG. 11 corresponds to the processing that is executed by the MFP 101 in steps S815 to S828 of the sequence diagram in FIG. 8. The CPU 211 reads a program stored in the ROM 212 or the HDD 214 of the MFP 101 to the RAM 213, and executes the program to execute the operations in the respective steps in the flowchart in FIG. 11.

In step S1101, the log-in management unit 501 that has received log-in information from the user accompanied by the log-in operation executes user authentication by using an external authentication server. The external authentication server used herein is the same as the authentication server which the web application 601 uses for executing authentication.

In step S1102, if the user authentication has succeeded (YES in step S102), the processing proceeds to step S1103. If the user authentication has failed (NO in step S1102), the processing proceeds to step S1120. In step S1120, the log-in management unit 501 displays an error and ends the processing.

In step S1103, the menu display unit 502 transmits a handover information acquisition request to the handover management unit 701 of the management server 103. Here, in order to acquire only the handover information corresponding to the logged-in user, the menu display unit 502 includes, in the acquisition request to be transmitted, the user ID authenticated in step S1101.

In step S1104, the menu display unit 502 receives a response to the acquisition request from the handover management unit 701 of the management server 103.

In step S1105, the menu display unit 502 determines whether the handover information is included in the response received in step S1104. If the handover information exists (YES in step S1105) the processing proceeds to step S1106. If the handover information does not exist (NO in step S1105), the processing proceeds to step S1110.

In step S1106, in order to access the handover URL included in the handover information, the menu display unit 502 calls the web browser 503. In step S1107, the web browser 503 accesses the handover URL. Here, the web browser 503 includes, in the request to be transmitted, the authentication information about the user authenticated in step S1101. Thereafter, the web browser 503 receives a user operation, communicates with the web application 601, and executes the web application 601 as necessary.

In step S1110, the menu display unit 502 displays a menu screen on which application buttons are arranged, and ends the processing.

The effect of the flowchart in FIG. 11 will be described. By simply logging in the MFP 101, the user can acquire handover information in association with the user registered in the management server 103, and hand over the operation state of the web application 601 indicated in the handover information to the MFP 101.

As described above, the user can hand over the operation state of the web application 601 operated with the mobile terminal 102 by simply logging in to the MFP 101 through the method described in the present exemplary embodiment. Thus, user convenience can be enhanced.

A second exemplary embodiment of the present invention will be described below. In the first exemplary embodiment, handover processing is always executed if handover information for a logged-in user exists when the user has logged in to the MFP 101. However, even if the handover information exists, the handover processing should not be executed in some cases. For example, if the user has logged in to another MFP, and the handover information has been handed over before the user logs in to the MFP 101, the handover information should not be handed over when the user logs in to the MFP 101 in a case where operations have not been completed to the end of the sequence, in some cases. There is a possibility that the handover processing should not be executed in a case where the user logs in to the MFP 101 after a long time has passed since an operation is performed on the web application of the information processing apparatus and the handover information is registered.

In the present exemplary embodiment, if the handover information exists when the user has logged in to the MFP 101, the MFP 101 determines whether a predetermined condition is satisfied, and does not execute handover processing depending on a result of the determination. The present exemplary embodiment is a variation of the first exemplary embodiment, and thus, only differences will be described.

Figure 15:
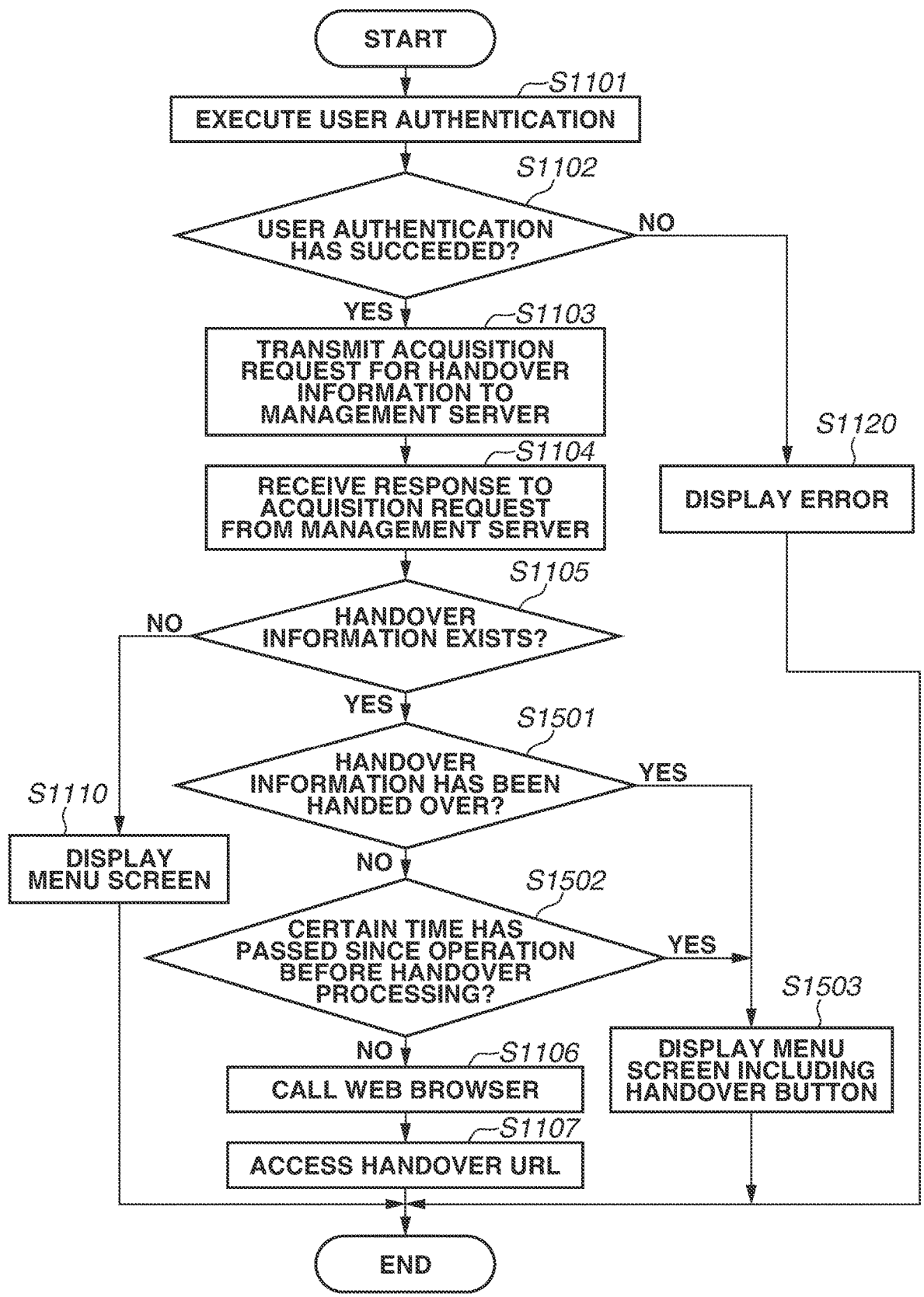
FIG. 15 is a flowchart illustrating processing which is executed by the MFP according to a second exemplary embodiment of the present disclosure.

The processing of the MFP 101 according to the present exemplary embodiment will be described. A flowchart in FIG. 15 is a variation of the flowchart in FIG. 11. This flowchart is different from the flowchart in FIG. 11 in that the steps S1501 to S1503 are newly added between the steps S1105 and S1106. In addition, each of the steps S1501 and S1502 is an independent conditional branching, and thus, it is not always necessary to add both of the steps S1501 and S1502 to the processing, and either one of the steps S1501 and S1502 may be added.

In step S1501, the menu display unit 502 determines whether the handover information received in step S1104 has been handed over. More specifically, the menu display unit 502 determines that the handover information has been handed over if a time is recorded in the MFP-Accessed column 1304 of the handover management table 702. If the handover information has been handed over (YES in step S1501) the processing proceeds to step S1503. If the handover information has not been handed over (NO in step S1501), the processing proceeds to step S1502.

In step S1502, the menu display unit 502 determines whether a certain period of time (e.g., 6 hours) has passed since the Web application 601 is operated with the mobile terminal 102 and the handover information is updated. More specifically, the menu display unit 502 compares the time recorded in the field of the Non-MFP-Accessed column 1303 corresponding to the handover information received in step S1140 and the current system time, and determines whether a certain period of time has passed. If a certain period of time has passed (YES in step S1502), the processing proceeds to step S1503. If a certain period of time has not passed (NO in step S1502), the processing proceeds to step S1106.

In step S1503, the menu display unit 502 displays a menu screen including a button for calling the handover information received in step S1104 as one of the application buttons. More specifically, a shortcut of the handover URL is displayed as an application button for calling the handover information. This configuration prevents the handover information from being always handed over with presence of the handover information, that is, the handover information is not handed over with the presence thereof if a predetermined condition is satisfied. The handover information can be handed over only if the user desires so, by the shortcut of the handover URL as the application button being displayed.

Through the method described in the present exemplary embodiment, even if the handover information for the logged-in user exists, handover processing is not executed if a predetermined condition is satisfied, and the handover information is handed over only if desired by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2019-074415, filed Apr. 9, 2019, which is hereby incorporated by reference herein in its entirety.

What is claimed is:
1. A system comprising:
a server system configured to communicate with at least information processing apparatus; and
an image forming apparatus configured to communicate with at least the server system,
wherein the server system includes at least one processor that causes the server system to act as:
a providing unit configured to, among operation screens involving screen transition, provide an operation screen to the information processing apparatus and the image forming apparatus,
wherein the operation screens are screens of a Web application and include a setting screen for performing image processing on the image forming apparatus, and
wherein the information processing apparatus and the image forming apparatus make a series of settings for the image processing while causing the operation screen provided by the providing unit to transition sequentially; and
a registering unit configured to register first information in association with identification information about a user who operates the information processing apparatus based on execution of the Web application on the information processing apparatus,
wherein the first information includes at least information indicating a first operation screen which is the operation screen provided by the providing means and to which the transition has been caused by an operation of the information processing apparatus by the user and a setting content set as a result of the operation performed on a previous operation screen before the transition to the first operation screen,
wherein the image forming apparatus includes:
an identifying unit configured to identify a user who operates the image forming apparatus;
a transmitting unit configured to transmit identification information about the user identified by the identifying unit; and
a display unit configured to display the operation screen provided by the providing unit, and
wherein the providing unit provides the setting content and the first operation screen to the image forming apparatus based on the first information registered by the registering unit in association with the identification information about the user, transmitted by the transmitting unit, and the display unit displays the first operation screen in a state in which the setting content that was set on the previous operation screen before the transition to the first operation screen is retained.
2. The system according to claim 1,
wherein the server system includes a server configured to provide the Web application and a management server, and
wherein the management server stores user information and a uniform resource locator (URL) for executing the Web application in association with each other.
3. The system according to claim 1, wherein the setting content is information including setting information set in respective operation screens.
4. The system according to claim 1,
wherein the at least one processor of the image forming apparatus further comprises a determining unit configured to determine whether a predetermined condition is satisfied based on the first information, and
wherein, in a case where it is determined that the predetermined condition is satisfied, a button for displaying the first operation screen is displayed in the state in which the setting content is retained.

5. The system according to claim 4, wherein the predetermined condition is a state of lapse of predetermined time after registering the first information by the registering unit.

6. The system according to claim 1,
wherein the at least one processor of the server system further comprises a storing unit configured to store second information in association with identification information about a user,
wherein first information is associated with the second information, and
wherein the second information contains information for executing the Web application.

7. The system according to claim 6, wherein the wherein the at least one processor of the server system further comprises a delete unit configured to:
delete, in a case where transition of the operation screen is caused to proceed to an end of a predetermined series of processes by an operation of a user, the second information associated with the user who performed an operation for the screen transition.

8. The system according to claim 6,
wherein the at least one processor of the image forming apparatus further comprises a acquiring unit configured to acquire the second information in association with identification information about the specified user, and
wherein the image forming apparatus is configured to access the server system with the second information which is acquired by the acquiring unit and the displaying unit is configured to display the provided operation screen.

9. The system according to claim 8,
wherein the acquiring means is configured to acquire, by transmitting the identification information about the specified user to the server system.

10. The system according to claim 6,
wherein, in the second information, information corresponding to the first operation screen and the setting content are attached to a uniform resource locator (URL) for performing the Web application, and
wherein the displaying means is configured to display an operation screen that is acquired by accessing the Web server using the URL to which the information is attached.

11. The system according to claim 1,
wherein the operation screens are operation screens for performing scan processing or print processing on the image forming apparatus.

12. The system according to claim 1,
wherein the registering unit registers the first information in a case where the Web application executed on the information processing apparatus is a predetermined Web application.

13. The system according to claim 12,
wherein the providing unit provides the operation screen in the case where the Web application executed on the information processing apparatus is the predetermined Web application, and
wherein the providing unit does not provide the operation screen in the case where the Web application executed on the information processing apparatus is not the predetermined Web application.

14. The system according to claim 1,
wherein, when the identifying unit identifies the user who operates the image forming apparatus, the display unit displays the first operation screen in the state in which the setting content is retained in a case where the first information registered by the registering unit in association with the identification information about the user, transmitted by the transmitting unit, exists and displays a menu screen on which function execution buttons are arranged in a case where the first information registered by the registering unit in association with the identification information about the user does not exist.

15. A method for controlling a server system configured to communicate with at least information processing apparatus, and an image forming apparatus configured to communicate with at least the server system, the method comprising:
providing, by the server system, among operation screens involving screen transition, an operation screen to the information processing apparatus and the image forming apparatus,
wherein the operation screens are screens of a Web application and include a setting screen for performing image processing on the image forming apparatus, and
wherein the information processing apparatus and the image forming apparatus make a series of settings for the image processing while causing the operation screen provided by the providing unit to transition sequentially;
registering, by the server system, first information in association with identification information about a user who operates the information processing apparatus based on execution of the Web application on the information processing apparatus,
wherein the first information includes at least information indicating a first operation screen which is the operation screen provided by the providing means and to which the transition has been caused by an operation of the information processing apparatus by the user and a setting content set as a result of the operation performed on a previous operation screen before the transition to the first operation screen;
identifying, by the image forming apparatus, a user who operates the image forming apparatus;
transmitting, by the image forming apparatus, identification information about the user identified by the identifying unit; and
display, by the image forming apparatus, the operation screen provided by the providing unit,
wherein the providing provides the setting content and the first operation screen to the image forming apparatus based on the first information registered by the registering in association with the identification information about the user, transmitted by the transmitting, and the displaying displays the first operation screen in a state in which the setting content that was set on the previous operation screen before the transition to the first operation screen is retained.

16. A non-transitory computer-readable storage medium storing a program that causes a computer to perform a method for controlling a server system configured to communicate with at least information processing apparatus, and an image forming apparatus configured to communicate with at least the server system, the method comprising:
providing, by the server system, among operation screens involving screen transition, an operation screen to the information processing apparatus and the image forming apparatus,
wherein the operation screens are screens of a Web application and include a setting screen for performing image processing on the image forming apparatus, and wherein the information processing apparatus and the image forming apparatus make a series of settings for the image processing while causing the operation screen provided by the providing unit to transition sequentially;

registering, by the server system, first information in association with identification information about a user who operates the information processing apparatus based on execution of the Web application on the information processing apparatus, wherein the first information includes at least information indicating a first operation screen which is the operation screen provided by the providing means and to which the transition has been caused by an operation of the information processing apparatus by the user and a setting content set as a result of the operation performed on a previous operation screen before the transition to the first operation screen;

identifying, by the image forming apparatus, a user who operates the image forming apparatus;

transmitting, by the image forming apparatus, identification information about the user identified by the identifying unit; and display, by the image forming apparatus, the operation screen provided by the providing unit, wherein the providing provides the setting content and the first operation screen to the image forming apparatus based on the first information registered by the registering in association with the identification information about the user, transmitted by the transmitting, and the displaying displays the first operation screen in a state in which the setting content that was set on the previous operation screen before the transition to the first operation screen is retained.

17. An image forming apparatus comprising:

at least one processor and at least a memory coupled to the at least one processor and having instructions stored thereon, and when executed by the at least one processor, acting as:

a providing unit configured to, among operation screens involving screen transition, provide an operation screen to the information processing apparatus and the image forming apparatus, wherein the operation screens are screens of a Web application for performing processing on the image forming apparatus, and wherein the information processing apparatus and the image forming apparatus make a series of settings for the processing while causing the operation screen provided by the providing unit to transition sequentially; and a registering unit configured to register first information in association with identification information about a user who operates the information processing apparatus based on execution of the Web application on the information processing apparatus, wherein the first information includes at least information indicating a first operation screen which is the operation screen provided by the providing means and to which the transition has been caused by an operation of the information processing apparatus by the user and a setting content set as a result of the operation performed on a previous operation screen before the transition to the first operation screen;

an identifying unit configured to identify a user who operates the image forming apparatus;

a transmitting unit configured to transmit identification information about the user identified by the identifying unit; and a display unit configured to display the operation screen provided by the providing unit;

wherein the providing unit provides the setting content and the first operation screen to the image forming apparatus based on the first information registered by the registering unit in association with the identification information about the user, transmitted by the transmitting unit, and the display unit displays the first operation screen in a state in which the setting content that was set on the previous operation screen before the transition to the first operation screen is retained.

* * * * *